(12) United States Patent
Zhang et al.

(10) Patent No.: US 11,777,888 B2
(45) Date of Patent: Oct. 3, 2023

(54) USER REQUEST RESPONSE METHOD AND APPARATUS, COMPUTER-READABLE STORAGE MEDIUM, AND DEVICE

(71) Applicant: BOE Technology Group Co., Ltd., Beijing (CN)

(72) Inventors: Zhiguo Zhang, Beijing (CN); Yang Zhang, Beijing (CN); Wenchu Dong, Beijing (CN); Meichao Li, Beijing (CN); Yuhai Sun, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/788,760

(22) PCT Filed: Sep. 7, 2021

(86) PCT No.: PCT/CN2021/116813
§ 371 (c)(1),
(2) Date: Jun. 24, 2022

(87) PCT Pub. No.: WO2022/089005
PCT Pub. Date: May 5, 2022

(65) Prior Publication Data
US 2023/0027245 A1    Jan. 26, 2023

(30) Foreign Application Priority Data
Oct. 27, 2020 (CN) .......................... 202011162731.8

(51) Int. Cl.
*H04L 51/224* (2022.01)
*H04L 51/222* (2022.01)
(Continued)

(52) U.S. Cl.
CPC ............ *H04L 51/224* (2022.05); *H04L 51/18* (2013.01); *H04L 51/222* (2022.05); *H04L 51/226* (2022.05); *H04L 51/234* (2022.05)

(58) Field of Classification Search
CPC ... H04L 51/224; H04L 51/222; H04L 51/226; H04L 51/234; H04L 51/18; H04L 51/52;
(Continued)

(56) References Cited

U.S. PATENT DOCUMENTS 9,419,848 B1 * 8/2016 Tidd ..................... H04L 65/4015
10,893,107 B1 * 1/2021 Callari .................. G06F 18/214
(Continued)

FOREIGN PATENT DOCUMENTS

CN    106326270 A    1/2017
CN    108335196 A    7/2018
(Continued)

OTHER PUBLICATIONS

International Search Report and Written Opinion dated Dec. 8, 2021, in corresponding PCT/CN2021/116813, 9 pages.
(Continued)

*Primary Examiner* — Ninos Donabed
(74) *Attorney, Agent, or Firm* — XSENSUS LLP

(57) ABSTRACT

The present application relates to the technical field of computers, and provides a user request response method, a user request response apparatus, a computer-readable storage medium, and an electronic device. The user request response method comprises: upon the reception of a user request sent from a first-type terminal, sending reminder messages to a plurality of second-type terminals according to the user request; receiving message receipts for the reminder messages within a preset time period; selecting a target message receipt from among the message receipts according to a preset rule; and using the second-type termi-
(Continued)

nal corresponding to the target message receipt as a target second-type terminal and determining to respond to the user request according to the target second-type terminal.

10 Claims, 4 Drawing Sheets

(51) Int. Cl.
*H04L 51/226* (2022.01)
*H04L 51/234* (2022.01)
*H04L 51/18* (2022.01)

(58) Field of Classification Search
CPC ....... H04L 51/10; H04L 51/212; H04L 51/42; H04L 51/046; H04L 51/04; G06Q 10/107
See application file for complete search history.

(56) References Cited

U.S. PATENT DOCUMENTS

| | | | |
|---|---|---|---|
| 11,023,832 B2 | 6/2021 | Zhang et al. | |
| 11,537,502 B1* | 12/2022 | Rohithakshappa | ........................... G06F 11/3624 |
| 2003/0037015 A1* | 2/2003 | Aggarwal | ............ G06F 16/2465 706/14 |
| 2003/0037025 A1* | 2/2003 | Aggarwal | .............. G06F 16/285 |
| 2004/0165528 A1* | 8/2004 | Li | ........................ H04L 47/724 370/468 |
| 2006/0242270 A1* | 10/2006 | Sankaranarayan | ... G06F 9/4411 709/220 |
| 2006/0253859 A1* | 11/2006 | Dai | ......................... G06F 9/545 719/321 |
| 2010/0208657 A1* | 8/2010 | Mizukoshi | .............. H04W 8/06 370/328 |
| 2013/0157666 A1* | 6/2013 | Uchino | ................... H04W 4/90 455/437 |
| 2015/0381598 A1* | 12/2015 | Koved | ................ H04W 12/065 726/3 |
| 2017/0277993 A1* | 9/2017 | Beaver | ............... G06Q 30/0201 |
| 2017/0330120 A1 | 11/2017 | Zhang et al. | |
| 2020/0258025 A1 | 8/2020 | Kopiychenk et al. | |
| 2022/0083375 A1* | 3/2022 | Zeng | ...................... G06F 9/5038 |

FOREIGN PATENT DOCUMENTS

| | | |
|---|---|---|
| CN | 109040970 A | 12/2018 |
| CN | 110096244 A | 8/2019 |
| CN | 110751539 A | 2/2020 |
| CN | 111583023 A | 8/2020 |
| CN | 111817948 A | 10/2020 |
| CN | 112422633 A | 2/2021 |
| WO | 2015/196908 A1 | 12/2015 |

OTHER PUBLICATIONS

Office Action dated Aug. 29, 2022, in corresponding Chinese patent Application No. 202011162731.8, 23 pages.

* cited by examiner

USER REQUEST RESPONSE METHOD AND APPARATUS, COMPUTER-READABLE STORAGE MEDIUM, AND DEVICE

CROSS-REFERENCE TO RELATED APPLICATIONS

This application is the U.S. national phase application of PCT Application No. PCT/CN2021/116813, filed Sep. 7, 2021, which claims the priority of Chinese Patent Application No. 202011162731.8, entitled "USER REQUEST RESPONSE METHOD AND APPARATUS, COMPUTER-READABLE STORAGE MEDIUM AND DEVICE", filed on Oct. 27, 2020, the entire content of each of which is incorporated herein by reference.

TECHNICAL FIELD

The present disclosure relates to a field of computer technology, and more particularly to a user request response method, a user request response apparatus, a computer-readable storage medium and an electronic device.

BACKGROUND

Generally, a bank branch provides many customer managers to serve users. When having questions about service they are processing, the users could seek help from the customer manager, or when a customer manager observes a client has a service problem, he/she may offer help. However, a location of the custom manage in a service hall is not fixed, and there may be no customer manager nearby when the user has a service processing problem, in that case, the customer manager cannot be informed of the user's needs in time and cannot provide timely assistance to the user, easily leading: to a problem of a low service processing efficiency.

it should be noted that the above information disclosed in the BACKGROUND section is only used to enhance the understanding of the background of the present disclosure, and therefore may include the .information that does not constitute the prior art known to those of ordinary skill in the art

SUMMARY

The present disclosure is directed to provide a user request response method, a user request response apparatus, a computer-readable storage medium and an electronic device, for timely notifying each class U terminal when receiving a user request, such that user of the class II terminal may provide service assistance to the user in time, thereby facilitating improvement in a service processing efficiency.

Other features and advantages of the present disclosure will become apparent through the following detailed description, or will be partly learned through the practice of the present disclosure.

According to a first aspect of the present disclosure, a user request response method, including:

when a user request sent by a class 1 terminal is received, sending notification messages to a plurality of class H terminals according to the user request;

receiving message receipts of the notification messages within a preset time, selecting a target message receipt from the message receipts according to a preset rule;

determining a class II terminal corresponding to the target message receipt as a target class II terminal, and determining to respond to the user request according to the target class terminal.

In an exemplary example of the present disclosure, sending the notification messages to the plurality of class II terminals according to the user request includes:

determining a service type corresponding to the user request;

determining a reference class II terminal matching the service type from the plurality of class II terminals:

sending the notification message to the reference class II terminal.

In an exemplary example of the present disclosure, sending the notification message to the reference class II terminal includes:

querying current state corresponding w the reference class II terminal., wherein the current state at least includes a busy state and an idle state:, determining, the reference class II terminal in the idle state as an idle class II terminal;

sending the notification message to the idle class II terminal,

In an exemplary example of the present disclosure, number of the idle class terminals is greater than or equal to 2, sending the notification messages to the idle class II terminals includes:

collecting current positions corresponding to the idle class II terminals, respectively;

ranking the idle class II terminals in an ascending order of distances between the current position corresponding to the idle class If terminals and a user's position;

sending the notification message to an idle class U terminal corresponding to a current position of a first rank in a ranking result.

In an exemplary example of the present disclosure, after determining the class II terminal corresponding to the target message receipt as the target class II terminal, and determining to respond to the user request according to the target class II terminal, the method further includes:

sending a task pickup failure receipt: to the idle class II terminal other than the target class II terminal from the idle class II terminals;

sending a task pickup success receipt to the target class ll terminal to switch the target class II terminal from the idle state to the busy state until the target class II terminal receives prompt information indicating an end of a consultation.

In an exemplary example of the present disclosure, after receiving the message receipts of the notification messages within the preset time, the method further includes:

receiving the notification message and displaying a task pickup interlace containing the notification message by the idle class II terminal, and if the idle class II terminal detects a user operation of an acceptance control in the task pickup interface, returning the message receipt of the notification message to a server.

In an exemplary example of the present disclosure, the task pickup interface further includes at least one of a task pickup countdown display area, a triggering time corresponding to the user request, a triggering position corresponding to the user request, the service type corresponding to the user request, and an identity of a class I terminal.

In an exemplary example of the present disclosure, alter determining the class II terminal corresponding to the target message receipt as the target class II terminal, and determining to respond to the user request according to the target class II terminal, the method further includes:

if the target class II terminal receives a new notification message and is in the busy state, displaying the task pickup interface containing the new notification message by the target second terminal: wherein the task pickup interface further includes prompt information configured for prompting to end a current task.

In an exemplary example of the present disclosure, after determining the class II terminal corresponding to the target message receipt as the target class II terminal, and determining to respond to the user request according to the target class H terminal, the method further includes:

if the target class II terminal receives a new notification message and is in the busy state, adding the new notification message to a queue to he processed until the target class II terminal is switched from the busy state to the idle state.

In an exemplary example of the present disclosure, the preset rule includes: determining the message receipt with the smallest difference between a message sending time and the triggering time as the target message receipt In an exemplary example of the present disclosure, if the message receipt of the notification message is not received within the preset time, the method further includes:

sending the notification message to a management terminal according to the user request; wherein the management terminal is configured to allocate the user request to at least one of the plurality of class II terminals.

According to a second aspect of the present disclosure, a user request response system is provided and includes:

a class I terminal, configured to send a user request to a server;

the server, configured to receive the user request and send notification messages to a plurality of class H terminals according to the user request;

the plurality of class II terminals, configured to receive the notification messages and send message receipts of the notification messages to the server;

wherein the server is further configured to receive the message receipts of the notification messages within a preset time; select a target message receipt from the message receipts according to a preset rule, determine the class II terminal corresponding to the target message receipt as a target class II terminal, and determine to respond to the user request according to the target class H terminal.

According to a third aspect of the present disclosure, a user request response apparatus is provided and includes:

a message sending unit, configured to send notification messages to a plurality of class II terminals according to the user request when a user request sent by a class I terminal is received:

a message receiving unit, configured to receive message receipts of the notification messages within a preset time;

a message selection unit, configured to select a target message receipt from the message receipts according to a preset rule;

a request response unit, configured to determine the class II terminal corresponding to the target message receipt as a target class II terminal, and determine to respond to the user request according to the target class II terminal.

In an exemplary example of the present disclosure, the message sending unit. sending the notification messages to the plurality of class H terminals according to the user request includes:

determining a service type corresponding to the user request;

determining a reference class II terminal matching the service type from the plurality of class II terminals;

sending the notification message to the reference class H terminal.

In an exemplary embodiment of the present disclosure, the message sending unit sending the notification message to the reference class H terminal includes:

querying current state corresponding to the reference class H terminal, wherein the current state at least includes a busy state and an idle state, determining the reference class II terminal in the idle state as an idle class II terminal;

sending the notification message to the idle class II terminal.

In an exemplary embodiment of the present disclosure, number of idle class II terminals is greater than or equal to 2, and sending the notification messages to the idle class II terminals includes:

collecting current positions corresponding to the idle class II terminals, respectively:

ranking the idle class II terminals in an ascending order of distances between the current position corresponding to the idle class II terminals and a user's position;

sending the notification message to an idle class II terminal corresponding to a current position of a first rank in a ranking result.

In an exemplary embodiment of the present disclosure, after the request response unit determines the class II terminal corresponding to the target message receipt as the target class II terminal, and determines to respond to the user request. according to the target class II terminal, the apparatus further includes:

a receipt sending unit, configured to send a task pickup failure receipt to the idle class II terminals other than the target class II terminal from the idle class II terminals: send a task receipt to the target class II terminal to switch the target class II terminal switch from the idle state to the busy state until the target class II terminal receives prompt information indicating an end of a consultation In an exemplary embodiment of the present disclosure, after the message receiving unit receives the message receipts of the notification messages within the preset time, further includes:

the idle class II terminal receives the notification message and displays the task pickup interface containing the notification message, and if the idle class II terminal detects a user operation of an acceptance control in the task pickup interface, the idle class II terminal returns the message receipt of the notification message to the server.

In an exemplary embodiment of the present disclosure, the task pickup interface farther includes at least one of a task. pickup countdown display area, a triggering time corresponding to the user request, a triggering position corresponding to the user request, the service type correspondin2 to the user request, and an identity of a class I terminal.

In an exemplary embodiment of the present disclosure, after the request response unit determines the class terminal corresponding to the target message receipt as the target class II terminal, and determines to respond to the user request according to the target class II terminal, and it further includes:

if the target class II terminal receives a new notification message and is in the busy state, displaying the task pickup interface containing the new notification message by the target second terminal: wherein the task pickup interface further includes prompt information configured for prompting to end a current task.

In an exemplary embodiment of the present disclosure, after the request response unit determines the class II terminal corresponding to the target message receipt as the target class II terminal, and determines to respond to the user request according to the target class II terminal, and it further includes:

if the target class II terminal receives a new notification message and is in the busy state, adding the new notification message to a queue to be processed until the target class If terminal is switched from the busy state to the idle state.

In an exemplary embodiment of the present disclosure, the preset rule includes: determining the message receipt with the smallest difference between a message sending time and the triggering time as the target message receipt.

In an exemplary embodiment of the present disclosure, the message sending unit is also configured to send the notification messages to a management terminal according to the user request if the message receipt of the notification message is not received within the preset time, and the management terminal is configured to allocate the user request to at least one of the plurality of class II terminals.

According to a fourth aspect of the present disclosure, an electronic device is provided and a processor. and a memory, configured for storing executable instructions of the processor;

the processor is configured to execute the method of any one of the above method via executing; the executable instructions.

According to a fifth aspect of the present disclosure, a computer-readable storage medium is provide, the computer-readable storage medium provided with a computer program stored thereon, wherein when executed by a process, the computer program implements any one of the above method.

It should be understood that both the .foregoing general description and the following detailed description are exemplary and explanatory only without limiting the present disclosure.

BRIEF DESCRIPTION OF THE DRAWINGS

Accompanying drawings herein, which are incorporated in the specification and constitute a part of the present specification, illustrate embodiments conforming to the present disclosure, and are used to explain the principles of the present disclosure together with the specification it is apparent that the accompanying drawings described below are only some embodiments of the present disclosure, and other accompanying drawings can also be obtained according to these accompanying drawings without any creative efforts by those skilled in the art.

DETAILED DESCRIPTION

Figure 1:
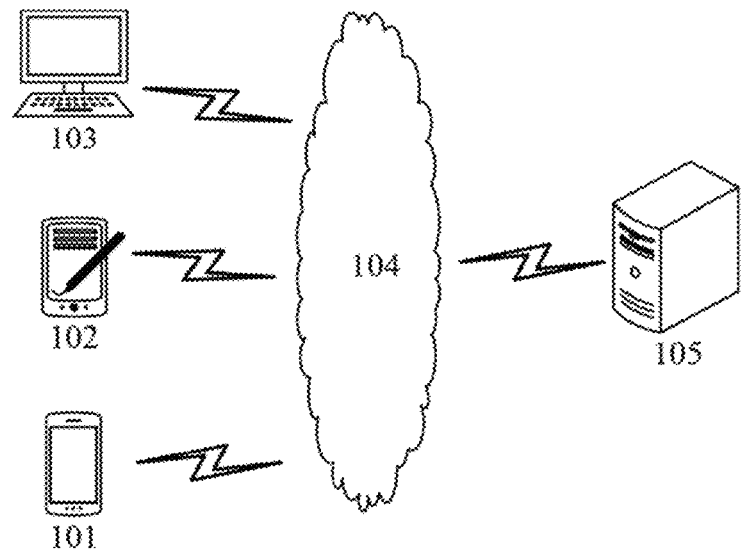
FIG. 1 shows an exemplarily schematic view of a system architecture of a user request response method and a user request response apparatus applicable to an embodiment of the present disclosure.

Example embodiments will now be described more fully with reference to the accompanying drawings. However, the example embodiments may be implemented in a variety of forms, and should not be understood as being, limited to the examples set forth herein. On the contrary providing these embodiments makes the present disclosure mote comprehensive and complete, and comprehensively communicates the concept of the example embodiments to those skilled in the art. The described features, structures, or characteristics may be combined in any suitable manner in one or more embodiments. In the following description, many specific details are provided to give a full understanding of the embodiments of the present disclosure. However, those skilled in the art will realize that the technical solution of the present disclosure may be practiced without omitting one or more specific details, or other methods, components, devices, steps, and the like may be adopted. In other cases, the well-known technical solution is not shown or described in detail to avoid confusing aspects of the present disclosure.

In addition, the accompanying drawings are only schematic illustrations of the present disclosure and are not necessarily drawn to scale. The same reference numerals in the drawings denote the same or similar components, and therefore repeated descriptions thereof will be omitted. Some block diagrams shown in the drawings are functional entities and do not necessarily correspond to physically or logically independent entities. These functional entities may be implemented in software form, or in one or more hardware modules or integrated circuits, or in different networks and/or processor devices and/or microcontroller devices.

FIG. 1 shows an exemplarily schematic view of a system architecture of a user request response method and a user request response apparatus applicable to an embodiment of the present disclosure.

As shown in FIG. 1, the system architecture 100 may include one or a plurality, of the terminal devices 101, 102, 103, a network 104, and a server 105. The network 104 is a medium for providing a communication link between the terminal devices 101, 102, 103 and the server 105. The network 104 may include various connection types, such as wired, wireless communication links, or optical fiber cables and the like. The terminal devices 101, 102. 103 may he various electronic devices with display screens, which include but is not limited to a desktop computer, a portable computer, a smart phone, a tablet computer, and the like. It should he understood that number of terminal devices, networks, and servers in FIG. 1 is merely schematic. There may be any number of terminal devices, networks and servers according to an implementation requirement. For example, the server 105 may be a server cluster composed of a plurality of servers.

The user request response method provided by the embodiment of the present disclosure is usually performed by the terminal device 101, 102 or 103. Accordingly, the user request response apparatus is usually arrant2ed in the terminal device 101, 102 or 103. However, it is easily understood ibr those skilled in the art that the user request response method provided by the embodiment of the present disclosure may also be executed by the server 105, and accordingly, the user request response apparatus may also be arranged in the server 105, which is not specially limited in the exemplary embodiment For example, in an exemplary embodiment, the server 105 may send notification messages to a plurality of class II terminals according to a user request when receiving a user request sent by a class I terminal; receive message receipts of the notification messages within a preset time; select a target message receipt from the message receipts according to a preset rule; determine a class II terminal corresponding to the target message receipt as a target class terminal, and determine to respond to the user request according to the target class II terminal. The class I terminal and the plurality of class ii terminals may be terminal devices 101, 102 or 103, respectively.

Figure 2:
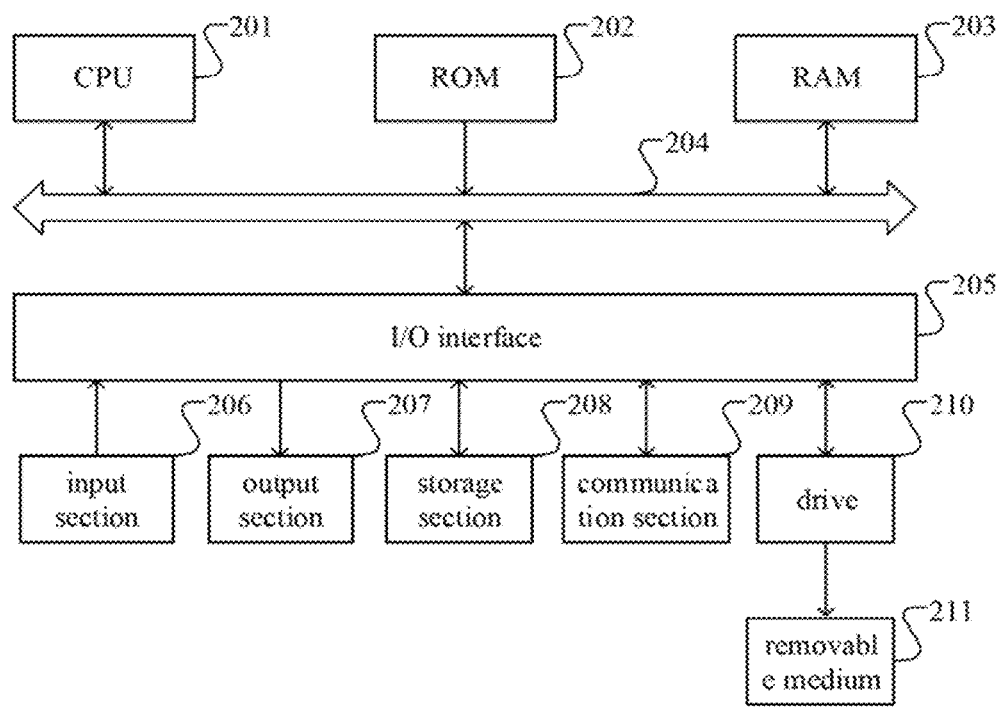
FIG. 2 shows a structural view era computer system suitable for implementing an electronic device according to an embodiment oldie present disclosure.

FIG. 2 shows a structural view of a computer system suitable for implementing an electronic device according to an embodiment of the present disclosure.

It should be noted that the computer system 200 or the electronic device shown in FIG. 2 is only an example and should not bring any limitation to functions and scope of use of the embodiments of the present disclosure.

As shown in FIG. 2, the computer system 200 includes a central processing unit (CPU) 201 that may perform various appropriate actions and. processes according to a program stored in a read only memory (ROM) 202 or a program loaded from a storage section 208 into a random access memory (RAM) 203. In RAM 203, various programs and data required for system operation are also stored. CPU 201, ROM 202, and RAM 203 are connected to each other through a bus 204. An input/output (I/O) interface 205 is also connected to the bus 204.

The following components are connected to the I/O interface 205 an input section 206 including a keyboard, a mouse, and the like, an output section 207 including a cathode ray tube (CRT), a liquid crystal display (LCD) and the like as well as a speaker, and the like, a storage section 208 including a bard disk, and the like, and a communication section 209 including a network interface card such as a LAN card, a modem, and the like. The communication section 209 performs communication processing via a network such as the Internet. A drive 210 is also connected to I/O interface 205 as required. A removable medium 211, such as a magnetic disk, an optical disk, a magneto-optical disk, semiconductor memory, and the like, is installed on the drive 210 as required, such that a computer program read from the removable medium 1211 is loaded into the storage section 208 as required.

Specifically, according to an embodiment of the present disclosure, process described below with reference to a flowchart may be implemented as a computer software program. For example, embodiments of the present disclosure include a computer program product including a computer program carried on a computer-readable medium, and the computer program including program code for executing the method shown in the flowchart. In such an embodiment, the computer program may be downloaded and installed from the network through the communication section 209, and/or installed from the removable medium 211. When the computer program is executed by the central processing unit (CPU) 201, various functions defined in the method and device of the present application are executed.

Figure 3:
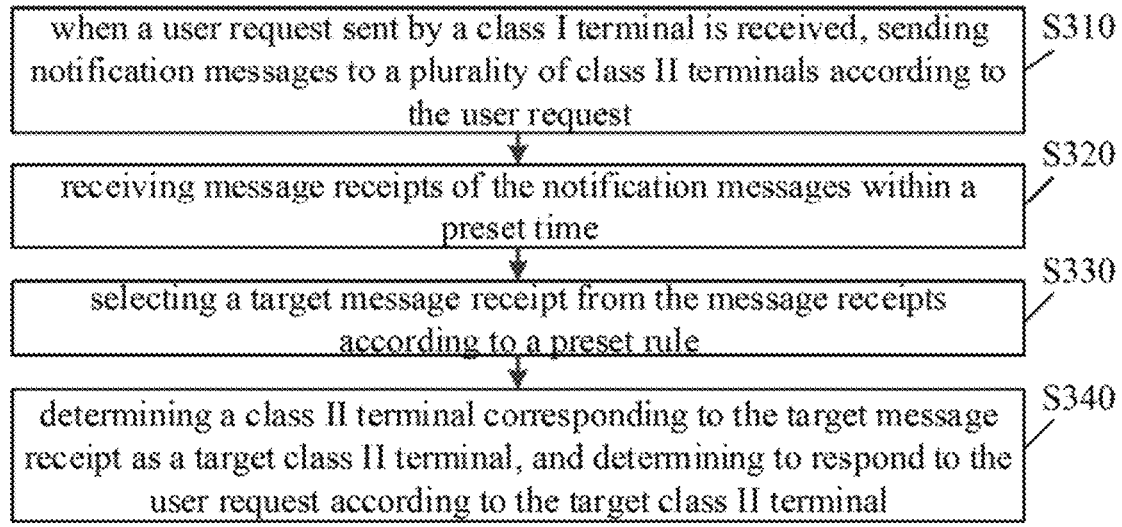
FIG. 3 schematically shows a flowchart of a user request response method according to an embodiment of the present disclosure.

Referring to FIG. 3, FIG. 3 schematically shows a flowchart of a user request response method according to an embodiment of the present disclosure. The user request response method may be applied to the foregoing server 105, and may also be applied to one or more of the above terminal devices 101, 102, 103, which is not specially limited in the present exemplary embodiment. Referring to FIG. 3, the user request response method may include the following steps S310 to S340:

step S310: when a user request sent by a class I terminal is received, sending notification messages to a plurality of class H terminals according to the user request;

step S320: receiving message receipts of the notification messages within a preset time;

step S330: selecting a target message receipt from the message receipts according to a preset rule:

step S340: determining a class II terminal corresponding to the target message receipt as a target class II terminal, and determining to respond to the user request according to the target class II terminal, It should be noted that the embodiment of the present disclosure may be applied to a smart-watch-based dispatch management system of a bank branch, When applied to the smart-watch-based dispatch management system of the bank branch, class 1 terminals may be user terminals of the bank branch or mobile terminals held. by users. A plurality of class II terminals may be smart watches/bracelets/mobile phones held by the customer managers so as to answer users' questions and assist relative services for the users, The user terminal may include a display interface used for showing the user service controls corresponding to different. services. The user ma interact with the service controls through click operation/touch operation/voice input operation, so as to trigger the user terminal to feed back the user request, corresponding to a service type of a selected service control, to the server.

Implementing the method shown in FIG. 3 may timely notify each class terminal when receiving the user request, such that the user of class H terminal (e g. the customer manager) may provide service assistance to the user in time, which is conducive to improving the service processing efficiency. In addition, it may prevent a long waiting for the user to get a response from the customer manager when processing. service, improve the response efficiency to the user request, and improve the service efficiency of users of class II terminals (such as the customer manager).

The above steps of the present exemplary embodiment will be described in more detail below.

In step S310, when a user request sent by a class I terminal is received, sending notification messages to a plurality of class II terminals according to the user request.

Specifically, the user request may he represented as a data packet including a parameter with at: least one of an identity of a class I terminal number (1D), a service type, a service ID, a triggering time, user information (e.g., user name, user gender, and the like). Before sending notification messages to the plurality of class II terminals according to the user request, it thriller includes: detecting whether the user request contains a manual call ID: if there is no manual call ID, executing the above-mentioned sending the notification messages to the plurality of class II terminals according to the user request; if there is manual call ID, sending the notification message a class II terminal corresponding to the manual call ID.

As an optional embodiment, sending the notification messages to the plurality of class II terminals according to the user request further includes: determining a service type corresponding to the user request; determining a reference class II terminal matching the service type from the plurality of class II terminals; sending the notification message to the reference class II terminal.

Specifically, it the user request is a service processing request, the service type may include: a liability service, an asset service, an intermediate service, and the like. The asset service may include a loan service, a securities investment service and a cash asset service, while the intermediary service may include a transaction service, a clearing service, payment and a settlement service, a bank card service, an agency service, a custody service, a guarantee service, a commitment seat ice. a financial management service and an e-banking service. In addition, there may be one or a plurality of reference class II terminals less than or equal to the above plurality of class II terminals.

Determining the service type corresponding to the user request includes reading parameter in the user request and determining the service type according to corresponding relationship of the parameter. Furthermore, before sending the notification message to the reference class II terminal, it further includes: generating the notification message according to the parameter in the user request, the notification message may be presented in form of a data packet, and the parameter included in the data packet may be completely or partially the same as the parameter in the user request.

In addition, if there is no reference class II terminal matching the service type from the plurality of class II terminals, which means, the reference class terminal matching the service type is not online, and it further includes sending the notification message to all class II terminals in an idle state.

It can be seen that this optional embodiment is implemented to promote holder of the class II terminal matching the service type requested by the user to serve for the user. Based on service proficiency, the service processing efficiency may be improved, which is conducive to bringing users a better service processing experience.

As an optional embodiment, sending the notification message to the reference class II terminal includes: querying current. state corresponding to the reference class II terminal, wherein the current state at least includes a busy state and an idle state; determining the reference class II terminal in the idle state as an idle class II terminal; sending the notification message to the idle class II terminal.

Specifically, the class II terminal includes an online state and an offline state, and the online state may include a busy state and an idle state. State of the class II terminal may be used to represent state of its holder.

querying the current state corresponding to the reference class II terminal includes sending a state request to the reference class H terminal such that the reference class II terminal may feed back the current state after verifying legitimacy of the state request.

Sending the notification message to the idle class II. terminal further includes sending the notification message to the idle class II terminal through Bluetooth, WIFI network or microwave transmission. There may be one or a plurality of idle class II terminals and number of the idle class II terminals is less than total number of the reference class II terminals.

In addition, if there is no reference class II terminal in the idle state, it further includes: determining number of messages in the queue to be processed corresponding to each reference class II terminal in the busy state:. ranking the reference class II terminals in the busy state in an ascending order of the numbers of the messages, selecting the reference class II terminal in the busy state from a ranking result and sending a notification message to the selected, reference class U terminal.

It may be seen that this optional embodiment is implemented such that the idle terminal may be selected to serve the user, so as to improve device utilization rate and service efficiency, and timber balance amount of the service to be processed for each class II terminal holder.

As an optional embodiment. number of the idle class terminals is greater than or equal to 2, and sending the notification messages to the idle class II terminals includes: collecting current positions corresponding to the idle class II terminals, respectively; ranking the idle class II terminals in an ascending order of distances between the current position corresponding to the idle class II terminals and a user's position; sending the notification message to an idle class II terminal corresponding to a current position of a first rank in a ranking result, In addition, before collecting the current positions of the idle class II terminals, it lather includes: ranking the idle class ft terminals in a descending order according to familiarity, and sending the notification message to an idle class II terminals corresponding to a current position of a first rank in a ranking result. Familiarity is used to indicate number of times that the user corresponding to the user request is served, and the more times, the higher the familiarity. If there is no idle class II terminal serving the user corresponding to the user request, performing the above-mentioned step of collecting current positions corresponding to the idle class II terminals.

It may be seen that the implementation of this optional embodiment may allocate the class II terminal closest to the user to the user, which is conducive to improving the service processing efficiency and service quality.

In step S320, receiving message receipts of the notification messages within a preset time;

The message receipts include an acceptance message receipt and a rejection message receipt, As an optional embodiment, if the message receipt of the notification message is not received within the preset time, the method further includes: sending the notification message to a management terminal according to the user request; the management terminal is configured to allocate the user request to at least one of the plurality of class II terminals.

Specifically, the management terminal is also used to respond to the notification message, that is, holder of the management terminal (e.g., a supervisor) may personally process the user's requirement to cope with the above situation.

It may be seen that the implementation of this optional embodiment may feed back the user's requirements to the manager without the customer manager accepting a task, such that the manager may timely allocate the customer manager to process the user's requirements, which is conducive to improving the service processing efficiency.

In step S330, selecting a target message receipt from the message receipts according to a preset rule.

Specifically, the preset rule may include: determining the message receipt with the smallest difference between a. message sending time and the triggering time as the target message receipt.

Selecting the target message receipt from the message receipts according to the preset rule includes: determining message sending time corresponding to each message receipt, ranking the message sending time corresponding to each message receipt in an early-to-late order, and selecting the target message receipt from a ranking result.

Furthermore, selecting, the target message receipt from the ranking result includes: determining the service type in the user request; determining the target message receipt matching number of people served from the ranking result according to the number of people served corresponding to the service type. It should be noted that there may be one or a plurality of target message receipts, which in not limited in the embodiments of the present disclosure. The user requests responded in the above way may enable the user to obtain better services. Assuming that the service selected by users is relatively complex, several customer managers may serve the user to better assist the user to process the service, thereby improving the users' service processing experience and enhancing a bank's brand image.

In step S340, determining a class II terminal corresponding to the target message receipt as a target class II terminal, and determining to respond to the user request according to the target class II terminal.

Determining the class II terminal corresponding to the target message receipt as the target class II terminal, determining to respond. to the user request according to the target class II terminal, including: determining the target class II terminal ID corresponding to the target message receipt, generating a feedback message according to the target class H terminal ID, and sending the feedback message to the class I terminal, so as to achieve the response to the user request. For example, the feedback message may be: the customer manager with employee ID 001 is about to serve you. Furthermore, after a sever determines the class II terminal corresponding to the target message receipt: as the target class II terminal, and determines to respond to the user request according to the target class II terminal, it further includes outputting a pop-up box containing a feedback message and/or a preset prompt tone by the class I terminal. In this way, the user may feel that the demand is responded in time, which is conducive to improving the user's service processing experience, Furthermore, the feedback message may further include the monthly/quarterly/annual score corresponding to the target class II terminal IDs for the user's reference. When there are a plurality of target class II terminal IDs, after the server sends the feedback message to the class I terminal, it further includes: receiving the feedback message and outputting a selecting interface by the class I terminal, the selecting interface may display the monthly/quarterly/annual score and message content corresponding to the target class II terminal IDs; detecting a user operation on at least one target class H. terminal ID, determining a preferred ID that is selected, and sending prompt information indicating the selection to the preferred ID. In this way, a two-way selection mode may be provided, such that the user may select the preferred object from the class II terminals that accept the task, which may improve inter and improve the user's. experience.

As an optional embodiment, after determining the class II terminal corresponding to the target message receipt as the target class II terminal, and determining to respond to the user request according to the target class If terminal, the method further includes: sending a task pickup failure receipt to the idle class II terminal other than the target class II terminal from the idle class II terminals:. sending a task pickup success receipt to the target class II terminal to switch the target class II terminal from the idle state to the busy state unlit the target class II terminal receives prompt information indicating ail end of a consultation.

Specifically, the task pickup failure receipt and the task pickup success receipt may be presented in form of text message. The prompt information used to indicate the end of consultation may include a satisfaction score, a service proficiency score, a service attitude score, and the like, which is not limited in the embodiments of the present disclosure.

After sending the task pickup success receipt to the target class II terminal, it further includes: receiving the task pickup success receipt and outputting prompt information, by the target class II terminal for prompting the user to go to a corresponding triggering position as soon as possible. The triggering position may be presented in form of coordinates. In addition, after the target class II terminal receives the prompt information indicting the end of the consultation, it further includes: switching the target class ii terminal from the busy state to the idle state.

In addition, before receiving the prompt information indicating the end of consultation, it further includes: when the class I terminal detects the user operation on a service end control, outputting a service evaluation page including various types of evaluation message (such as the satisfaction score, the service proficiency score, the service attitude score); receiving a user input operation on the service evaluation page, generating the prompt information indicating the end of the consultation according to the user input operation and sending the prompt information to the server, and the server forwarding the prompt information indicating the end of the consultation to the target class II terminal.

It may be seen that the implementation of this optional embodiment may timely feed back a receipt: to the terminal accepting the task, such that: the terminal may he timely informed whether the task is successfully accepted, thereby reducing impact on the terminal when accepting other tasks.

Figure 4:
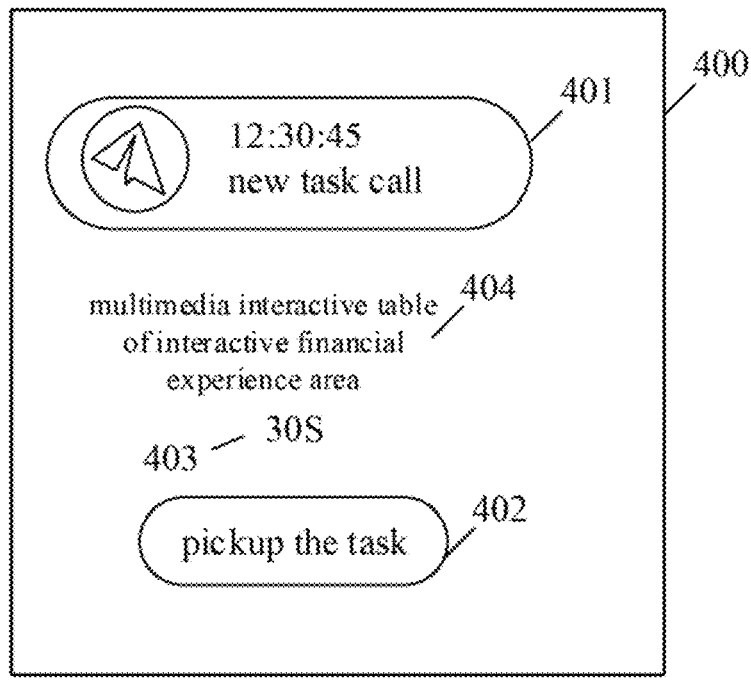
FIG. 4 schematically shows a task pickup interface according to an embodiment of the present disclosure.

As an optional embodiment, after receiving the message receipts for the notification messages within the preset time (e,g., 30 s), the method further includes: receiving the notification message and displaying a task pickup interface containing the notification message by the idle class II terminal, and if the idle class II terminal detects a user operation of an acceptance control in the task pickup interface, returning the message receipt of the notification message to a server, Referring to FIG. 4, FIG. 4 schematically shows a. task pickup interlace according to an embodiment of the present disclosure, As shown in FIG. 4, the task pickup interface 400 may include: a countdown display area 403 showing countdown-"30s", a task message display area 401 showing "12:30:45 new task call", a triggering position 404 corresponding to the user request of the "multimedia interactive table of interactive financial experience area", and an acceptance control 402 indicating "pickup the task": The task message display area 401 is used to display a triggering time corresponding to the user request. Optionally, the task message display area 401 may also be used to display content that is not shown in the drawings and corresponds to the user request, such as a service type, an identity of a class I terminal number, a service description and the like, which is not limited in the embodiments of the present disclosure.

In addition, optionally, the task pickup interface 400 may further include a rejection control (not shown). When the customer manager sees the displayed task message, he/she may refuse to accept the task by clicking the rejection control. The task pickup interface may further include the service type and the identity of a class I terminal number corresponding to the user request.

Specifically, when receiving the notification message, the idle class II terminal may display the task pickup interface 400, and a holder of the idle class It terminal (e.g., customer manager) may decide whether to accept the task through the content displayed in the task pickup interface 400. Further, the task may be received by interacting with the acceptance control 402 before the end of the countdown in the countdown display area 403. If the idle class II terminal does not detect the user operation on the acceptance control 402 before the end of the countdown m the countdown display area 403, it is determined that the user refuses to accept the task and exits the task pickup interface 400.

It may be seen that the implementation of this optional embodiment may enable the customer manager to know the user's requirement in time by outputting the task pickup interface, which is conducive for a rapid response to the user's requirement.

As an optional embodiment, the class II terminal corresponding to the target message receipt is determined as the target class II terminal. After determining to respond to the user request according to the class II terminal, the method further includes: if the target class II terminal receives a new notification message and is in the busy state, displaying the task pickup interface containing the new notification message by the target second terminal; wherein the task pickup interface further includes prompt information configured for prompting to end a current task.

In addition, after the target class II terminal displays the task pickup interface, it further includes: if the acceptance operation fur the new notification message is detected, adding a task corresponding to the new notification message to a queue to be processed corresponding to the target class II terminal by the target class II terminal.

It may be seen that the implementation of this optional embodiment may timely display the task pickup interface, provide the customer manager with options, enable him to choose to accept or reject according to the current service progress, and improve freedom of choice.

As an optional embodiment, the class II terminal corresponding to the receipt of the target message is regarded as the class II terminal. After determining the class II terminal corresponding to the target message receipt as the target class II terminal, and determining to respond to the user request according to the target class II. terminal, the method further includes: if the target class II terminal receives a new notification message and is in the busy state, adding the new notification message to a queue to be processed until the target class II terminal is switched from the busy state to the idle state.

Specifically, the queue to he processed corresponds to a storage upper limit (e.g., 10), and adding the new notification message to the queue to be processed., includes: detecting whether the queue to be processed after adding the new notification message exceeds the storage upper limit; if note performing the above steps to add the new notification message to the queue to be processed; if yes, discard the new notification message and output the notification message to prompt the user that the queue is up to the upper limit.

It may be seen that this optional embodiment is implemented such that the class II terminal in the busy state may also continue to accept the task, such that the customer manager may immediately enter the next task after serving the current customer, so as to improve the service processing efficiency.

Figure 5:
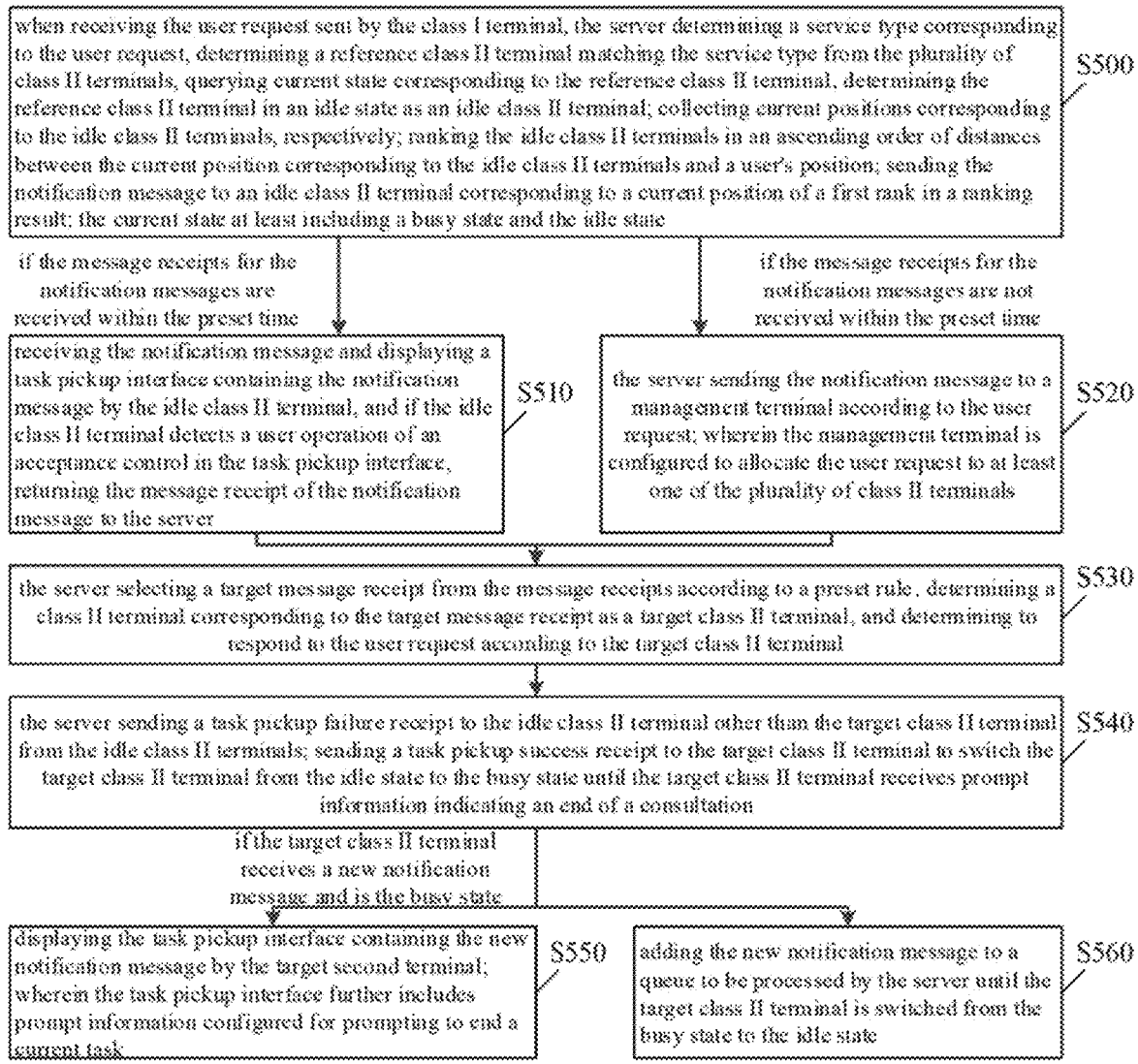
FIG. 5 schematically shows a flowchart of a user request response method according to an embodiment of the present disclosure.

Referring to FIG. 5, FIG. 5 schematically shows a flowchart of a user request response method according to an embodiment of the present disclosure. As shown in FIG. 5. the user request response method may include steps S500 to S560, in which:

step 5500: when receiving the user request sent by the class I terminal, the server determining a service type corresponding to the user request, determining a reference class II terminal matching the service type from the plurality of class II terminals, querying current state corresponding to the reference class II terminal, determining the reference class II terminal in an idle state as an idle class II terminal; collecting current positions corresponding to the idle class II terminals, respectively; ranking the idle class II terminals in an ascending order of distances between the current position corresponding to the idle class II terminals and a uses position; sending the notification message to an idle class II terminal corresponding to a current position of a first rank in a ranking result; the current state at least including a busy state and the idle state. If the message receipts for the notification messages are received within the preset time, prelbrming step S510 if the message receipts for the notification messages are not received within the preset time, performing to step S520.

Step S510: receiving the notification message and displaying a task pickup interface containing the notification message by the idle class ft terminal, and if the idle class II terminal detects a user operation of an acceptance control in the task pickup interface, returning the message receipt of the notification message to the server, then performing step S530.

Step S520: the server sending the notification message to a management terminal according to the user request; wherein the management terminal is configured to allocate the user request to at least one of the plurality of class II terminals. It should be noted that there may be one or a plurality of management terminals, which is not limited in the embodiments of the present disclosure, then performing step S530.

Step S530: the server selecting a target message receipt from the message receipts according to a preset rule, determining a class II terminal corresponding to the target message receipt as a target class II terminal, and determining to respond to the user request according to the target class II terminal.

Step S540: the server sending a task pickup failure receipt to the idle class II terminal other than the target class II terminal from the idle class II terminals; sending a task pickup success receipt to the target class U terminal to switch the target class H terminal from the idle state to the busy state until the target class II terminal receives prompt information indicating, an end of a consultation, if the target class II terminal receives a new notification message and is the busy state, performing step S550 or step S560.

Step S550: displaying the task pickup interface containing the new notification message by the target second terminal; wherein the task pickup interface further includes prompt information configured for prompting to end a current task.

Step S560: adding the new notification message to a queue to be processed by the server until the target class II terminal is switched from the busy state to the idle state.

It should be noted that steps S500 to S560 correspond to the steps arid embodiments shown in FIG. 3. For the specific implementations of steps S500 to S560, please referring to the steps and embodiments shown in FIG. 3 and will not be repeated herein.

Figure 6:
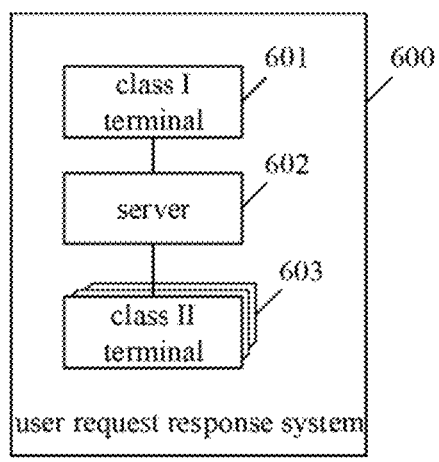
FIG. 6 schematically shows a structural block diagram of a user request response system according to an embodiment of the present disclosure.

Referring to FIG. 6, FIG. 6 schematically shows a structural block diagram of a user request response system according to an embodiment of the present disclosure. As shown in FIG. 6, the user request response system 600 may include:

a class I terminal 601 configured to send a user request to a server 602;

the server 602 configured to receive the user request and send a notification message to a plurality of class II terminals according to the user request;

the plurality of class II terminals 603 configured to receive the notification message and send message receipts of the notification messages to the server 602;

the server 602 is also configured to receive the message receipts of the notification messages within a preset time; select a target message receipt from the message receipts according to a preset rule; respond to the user request according to a target class II terminal 603 corresponding to the target message receipt.

The user request: response system may be a smart-watch-based dispatch management system of a bank branch, and there may be one or a plurality of the class I terminals, which is not limited in the present disclosure. The server may be a service cluster.

It may be seen that the implementation of the system shown in FIG. 6 may timely notify each class II terminal when receiving the user request, such that the user of class II terminal (such as the customer manager) may provide service assistance to the users in time, which is conducive to improving the service processing efficiency. In addition, it may prevent a long waiting for the user to get a response from the customer manager when processing service, improve the response efficiency to the user request, and improve the service efficiency of the user of class II terminal (such as the customer manager).

Figure 7:
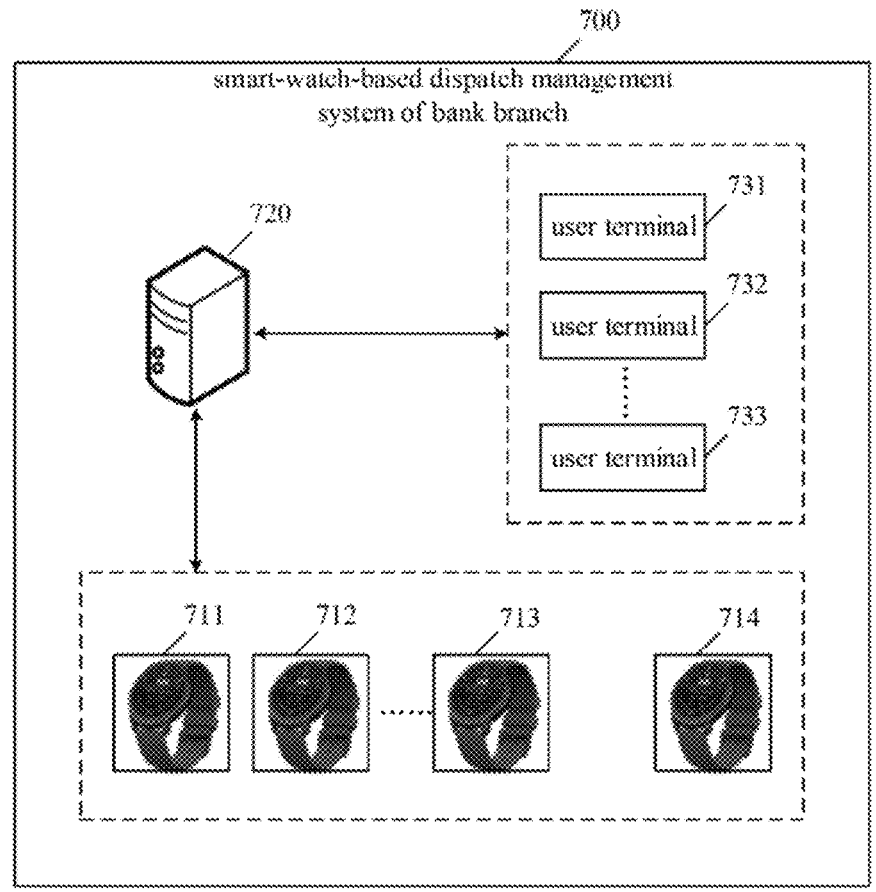
FIG. 7 schematically shows a structural block diagram of a smart-watch-based dispatch management system of a bank branch according to an embodiment of the present disclosure.

On the basis of FIG. 6, please referring to FIG. 7, FIG. 7 schematically shows a structural block diagram of a smart-watch-based dispatch management system of a bank branch according to an embodiment of the present disclosure. As shown in FIG. 7, the smart-watch-based dispatch management system 700 of a bank branch may include: smart watches 711, 712 and 713 corresponding to customer managers, a smart watch 714 corresponding to a manager, a server 720, a user terminal 731, a user terminal 732 and a user terminal 733. The smart watches corresponding to the customer managers and the smart watch corresponding to the manaeer may correspond to the plurality of class II terminals 603 in FIG. 6, the server 720 corresponds to the server 602 in FIG. 6, and the user terminal corresponds to the class I terminal 601 in FIG. 6. It should be noted that the user terminal 731, the user terminal 732 and the user terminal 733 may be the same (such as a service processing terminal set by the bank branch) or different device (such as a mobile terminal used to log in the dispatch management system and the service processing terminal set by the bank branch), Specifically, when receiving the user request sent by any one of the user terminals 731, 732 and 733. the server 720 may send the notification message to the smart watches 711, 712 and 713 to notify a holder of the smart watch (i.e., the customer manager) to accept a task and improve the service processing efficiency, which is conducive for the customer manager to responding the user's requirement in time, so as to improve the user's service processing experience. In addition, before an end of the task countdown, if no customer manager accepts the task, a notification message is sent to the smart watch 714 corresponding to the manager to urge the manager to allocate the task to the smart watches 711, 712 and 713, so as to achieve effect of a rapid response to user's requirement.

Figure 8:
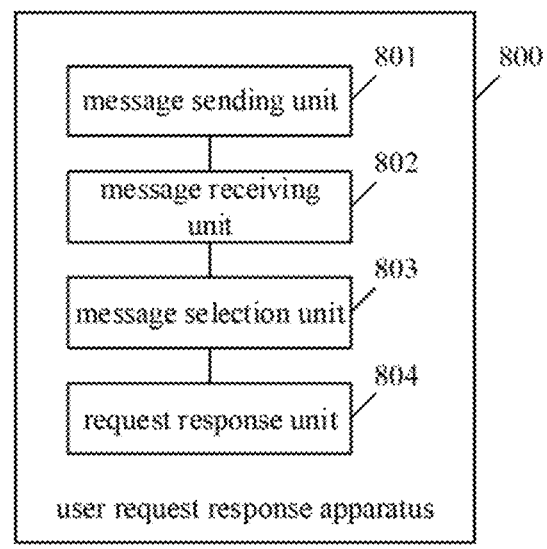
FIG. 8 schematically shows a structural block diagram of a user request response apparatus according to an embodiment of the present disclosure.

Further, in the present exemplary embodiment, a user request response apparatus is also provided. Referring to FIG. 8, the user request response apparatus 800 may include:

a message sending unit 801, configured to send notification messages to a plurality of class II terminals according to the user request when a user request sent by a class I terminal is received:

to message receiving unit 802 configured to receive message receipts of the notification messages within a preset time:

a message selection unit 803, configured to select a target message receipt from the message receipts according to a preset rule;

a request response unit 804, configured to determine the class II terminal corresponding to the target message receipt as a target class II terminal, and determine to respond to the user request according to the target class II terminal.

The preset rule may include: determining the message receipt with the smallest difference between a message sending time and the triggering time as the target message receipt.

It may be seen that the implementation of the apparatus shown in FIG. 8 may timely notify each class II terminal when receiving the user request, such that the user of class II terminal (such as the customer manager) may provide service assistance to the users in time, which is conducive to improving the service processing efficiency. In addition, it may prevent a long waiting for the user to get a response, from the customer manager when processing service, improve the response efficiency to the user request, and improve the service efficiency of the user of class II terminal (such as the customer manager).

In an exemplary embodiment of the present disclosure, the message sending unit 801 sending the notification messages to the plurality of class II terminals according to the user request, includes:

determining a sere ice type corresponding to the user request;

determining a reference class II terminal matching the service type from the plurality of class II terminals;

sending the notification message to the reference class II terminal.

It can be seen that this optional embodiment is implemented to promote holder of the class II terminal matching the service type requested by the user to serve for the user. Based on service proficiency, the service processing efficiency may be improved, which is conducive to bringing users a better service processing experience.

In an exemplary embodiment of the present disclosure, the message sending unit 801 sending the notification message to the reference class II terminal, includes:

querying current state corresponding to the reference class II terminal, wherein the current state at least includes a busy state and an idle state;

determining the reference class II terminal in the idle state as an idle class II terminal;

sending the notification message to the idle class II terminal.

It may be seen that this optional embodiment is implemented such that the idle terminal may be selected to serve the user, so as to improve device utilization rate and service efficiency, and further balance amount of the service to be processed for each class II terminal holder.

In an exemplary embodiment of the present disclosure, number of idle class II terminals is greater than or equal to 2, and sending the notification messages to the idle class II terminals includes:

collecting current positions corresponding to the idle class II terminals, respectively;

ranking the idle class II terminals in an ascending order of distances between the current position corresponding to the idle class II terminals and a user's position;

sending, the notification message to an idle class II terminal corresponding to a current position of a first rank in a ranking result.

It may be seen that the implementation of this optional embodiment may allocate the class II terminal closest to the user to the user, which is conducive to improving the service processing efficiency and service quality:

In an exemplary embodiment of the present disclosure, after the request response unit 804 determines the class II terminal corresponding to the target message receipt as the target class II terminal, and determines to respond to the user request according to the target class II terminal, the apparatus further includes:

a receipt sending unit (not shown), configured to send a task pickup failure receipt to the idle class II terminals other than the target class II terminal from the idle class II terminals; send a task receipt to the target class H terminal to switch the target class terminal switch from the idle state to the busy state until the target class II terminal receives prompt information indicating an end of a consultation.

It may be seen that the implementation of this optional embodiment may timely feed back a receipt to the terminal accepting the task, such that the terminal may he timely informed whether the task is successfully accepted, thereby reducing impact on the terminal when accepting other tasks.

In an exemplary embodiment of the present disclosure, after the message receiving unit 802 receives the message receipts of the notification messages within the preset time, further includes:

the idle class II terminal receives the notification message and displays the task pickup interface containing the notification message, and if the idle class II terminal detects a user operation of an acceptance control in the task pickup interlace, the idle class II terminal returns the message receipt of the notification message to the server.

The task pickup interface further includes at least one of a task pickup countdown display area, a triggering time corresponding to the user request, a triggering position corresponding to the user request, the service type corresponding to the user request, and an identity of a class I terminal It may be seen that the implementation of this optional embodiment may enable the customer manager to know the user's requirement in time by outputting the task pickup interface, which is conducive for a rapid response to the user's requirement.

In an exemplary embodiment of the present. disclosure, after the request response unit 804 determines the class II terminal corresponding to, the target message receipt as the target class II terminal, and determines to respond to the user request according to the target class H terminal, and it further includes:

if the target class II terminal receives a new notification message and is in the busy state, displaying the task pickup interface containing the new notification message by the target second terminal; wherein the task pickup interface further includes prompt information configured for prompting to end a current task.

It may be seen that the implementation of this optional embodiment may timely display the task pickup interface, provide the customer manager with options, enable him to choose to accept or reject according to the current service progress, and improve freedom of choice.

In an exemplary embodiment of the present disclosure, after the request response unit 804 determines the class 1f terminal corresponding to the target message receipt as the target class II terminal, and determines to respond to the user request according to the target class II terminal, and it further includes;

If the target class ft terminal receives a new notification message and is in the busy state, adding the new notification message to a queue to be processed until the target class II terminal is switched from the busy state to the idle state.

It may be seen that this optional embodiment is implemented such that the class II terminal in the busy state may also continue to accept the task, such that the customer manager may immediately enter the next task after serving the current customer, so as to improve the service processing efficiency.

In an exemplary embodiment of the present disclosure, the message sending unit 801 is also configured to send the notification messages to a management terminal according to the user request if the message receipt of the notification message is not received within the preset time, and the management terminal is configured to allocate the user request to at least one of the plurality of class II terminals.

It may be seen that the implementation of this optional embodiment may feed back the user's requirements to the manager without the customer manager accepting a task, such that the manager may timely allocate the customer manager to process the user's requirements, which is conducive to improving the service processing efficiency.

It should be noted that although several modules or units of the device for performing actions are described in detail above, this division is not mandatory. In fact, according to the embodiments of the present disclosure, features and functions of two or more modules or units described above may be embodied in one module or unit. Conversely, the features and functions of one module or unit described above may be further divided into a plurality of modules or units to be embodied.

Since each functional module of the user request response apparatus according to exemplary embodiments of the present disclosure corresponds to the steps of the exemplary embodiments of the above user request response method, for details not disclosed in the embodiments of the device of the present disclosure, please refer to the above embodiments of the user request response method of the present disclosure.

On the other hand, the present disclosure further provides a computer-readable medium, which may be included in the electronic device described in the above embodiments, or may be present separately without being installed into the electronic device. The computer-readable medium carries one or a plurality of programs, and when the one or the plurality of programs are executed by the electronic device, the electronic device is enabled to implement the method described in the above embodiments.

it should be noted that the computer-readable medium shown in the present disclosure may be a computer-readable signal medium, a computer-readable storage medium, or any combination of the two. The computer-readable storage medium may be, for example, but is not limited to, an electronic., magnetic, optical, electromagnetic, infrared, or semiconductor system, device, or apparatus, or any combination thereof. More specific. examples of computer readable storage media may include, but are not limited to: electrical connection with one or a plurality of wires, portable disk, hard disk, random access memory (RAM), read-only memory (ROM), erasable programmable read-only memory (EPROM or flash memory), optical fiber, portable compact disc read-only memory (CD-ROM), optical storage apparatus, magnetic storage apparatus, or any suitable combination thereof. In the present disclosure, a computer-readable storage medium may be any tangible medium containing or storing a program that may be used by or in combination with an execution system, device, or apparatus. In the present disclosure, the computer-readable signal medium may include a data signal in baseband or propagated as part of a carrier wave, which carries readable program codes. Such a propagated data signal may have many forms, including but not limited to electromagnetic signals, optical signals or any suitable combination of the above. The readable signal medium may also be any readable medium other than a readable storage medium, and the readable medium may send, propagate, or transmit a program that is used by an instruction execution system, device, or apparatus, or that is used. in combination with an instruction execution system, device, or apparatus. The program code contained on the computer-readable medium may be transmitted by any suitable medium, including but not limited to: wireless, wire, optical cable, RF, etc., or any suitable combination of the above.

The flowcharts and block diagram in the accompanying drawings illustrate the possible architectures, functions, and operations of systems, methods, and computer program products according to various embodiments of the present disclosure. In this regard, each block in a flowchart or block diagram may represent a module, program segment, or a part of code that contains one or a plurality of executable instructions for implementing a specified logic function. It should also be noted that in some alternative implementations, functions indicated in the block may also occur in a different sequence than those indicated in the drawings. For example, two contiguous blocks may actually be executed in substantially parallel, or be executed in reverse sequence sometimes, depending on the function involved. It should also be noted that each block in the block diagram or flowchart and the combination of the blocks in the block diagram or flow chart may be implemented by a dedicated hardware based system that performs a specified function or operation, or by a combination of dedicated hardware and computer instructions.

The units described in the embodiments of the present disclosure may be implemented in software or hardware, and the described units may also be arranged in the processor. in some cases, names of these units cannot constitute a limitation to the units.

Those skilled in the art will readily contemplate other embodiments of the present disclosure after considering the specification and practicing the disclosure, The present disclosure is intended to cover any variations, uses, or adaptive changes of the present disclosure. These variations, uses, or adaptive changes follow the general principles of the present disclosure and include the common general knowledge or conventional technical means in this art which is not described herein. The specification and examples should be considered as exemplary only, and the true scope and spirit of the disclosure should be defined by the appended claims.

It should be understood that the present disclosure is not limited to the precise structure that has been described above and shown in the drawings, and various modifications and changes may he made without departing from the scope of the present disclosure, The scope of the disclosure is only defined by the appended claims.

What is claimed is:

1. A user request response method, comprising:
   when a user request sent by a class I terminal is received, sending notification messages to a plurality of class II terminals according to the user request;
   receiving message receipts of the notification messages within a preset time;
   selecting a target message receipt from the message receipts according to a preset rule;
   determining a class II terminal corresponding to the target message receipt as a target class II terminal,
   determining to respond to the user request according to the target class II terminal;
   wherein sending the notification messages to the plurality of class II terminals according to the user request comprises:
   determining a service type corresponding to the user request;
   determining a reference class II terminal matching the service type from the plurality of class II terminals; and
   sending the notification message to the reference class II terminal;
   wherein sending the notification message to the reference class II terminal comprises:
   querying current state corresponding to the reference class II terminal, wherein the current state at least comprises a busy state and an idle state;
   determining the reference class II terminal in the idle state as an idle class II terminal;
   sending the notification message to the idle class II terminal;
   wherein after determining the class II terminal corresponding to the target message receipt as target class II terminal, and the determining to respond to the user request according to the target class II terminal, the method further comprises:
   sending a task pickup failure receipt to the idle class II terminal other than the target class II terminal from the idle class II terminals;
   sending a task pickup success receipt to th target class II terminal to switch the target class II terminal from the idle state to the busy state until the target class II terminal receives prompt information indicating an end of a consultation;
   wherein after receiving the message receipts of the notification messages within the preset time, the method further comprises:
   receiving the notification message and displaying a task pickup interface containing the notification message by the idle class II terminal, and if the idle class II terminal detects a user operation of an acceptance control in the task pickup interface, returning the message receipt of the notification message to a server; and
   wherein the task pickup interface further comprises a task pickup countdown display area, a triggering time corresponding to the user request, the service type corresponding to the user request, a triggering position corresponding to the user request, and an identity of a class I terminal.

2. The method according to claim 1, wherein number of the idle class II terminals is greater than or equal to 2, sending the notification messages to the idle class Il terminals comprises: collecting current positions corresponding to the idle class II terminals, respectively; ranking the idle class II terminals in an ascending order of distances between the current position corresponding to the idle class II terminals and a user's position; sending the notification message to an idle class II terminal corresponding to a current position of a first rank in a ranking result.

3. The method according to claim 1, wherein after determining the class II terminal corresponding to the target message receipt as the target class II terminal, and determining to respond to the user request according to the target class II terminal, the method further comprises: if the target class II terminal receives a new notification message and is in the busy state, displaying the task pickup interface containing the new notification message by the target second terminal;
   wherein the task pickup interface further comprises prompt information configured for prompting to end a current task.

4. The method according to claim 1, wherein after determining the class II terminal corresponding to the target message receipt as the target class II terminal, and determining to respond to the user request according to the target class II terminal, the method further comprises: if the target class II terminal receives a new notification message and is in the busy state, adding the new notification message to a queue to be processed until the target class II terminal is switched from the busy state to the idle state.

5. The method according to claim 1, wherein the preset rule comprises: determining the message receipt with the smallest difference between a message sending time and the triggering time as the target message receipt.

6. The method according to claim 1, wherein if the message receipt of the notification message is not received within the preset time, the method further comprises: sending the notification message to a management terminal according to the user request; wherein the management terminal is configured to allocate the user request to at least one of the plurality of class II terminals.

7. A user request response system, comprising: a processor and memory; a class I terminal, configured to send a user request to a server; the server, configured to receive the user request and send notification messages to a plurality of class II terminals according to the user request;
   the plurality of class II terminals, configured to receive the notification messages and send message receipts of the notification messages to the server; wherein the server is further configured to receive the message receipts of the notification messages within a preset time;
   determine a service type corresponding to the user request;
   wherein sending the notification messages to the plurality of class II terminals according to the user request comprises: determine a service type corresponding to the user request;
   determine a reference class II terminal matching the service type from the plurality of class II terminals;
   send the notification message to the reference class II terminal;
   wherein sending the notification message to the reference class II terminal comprises:
   query current state corresponding to the reference class II terminal, wherein the current state at least comprises a busy state and an idle state;
   determine the reference class II terminal in the idle state as an idle class II terminal;
   send the notification message to the idle class II terminal;
   wherein after determining the class II terminal corresponding to the target message receipt as the target class II terminal, the processor further configured to:
   determine to respond to the user request according to the target class II terminal, send a task pickup failure receipt to the idle class II terminal other than the target class II terminal from the idle class II terminals;
   send a task pickup success receipt to the target class II terminal to switch the target class II terminal from the idle state to the busy state until the target class II terminal receives a prompt information indicating an end of a consultation;
   wherein after receiving the message receipts of the notification messages within the preset time,
   receive the notification message and display a task pickup interface containing the notification message by the idle class II terminal, and if the idle class II terminal detects a user operation of an acceptance control in the task pickup interface,
   return the message receipt of the notification message to a server; and
   wherein the task pickup interface further comprises a task pickup countdown display area, a triggering time corresponding to the user request, the service type corresponding to the user request, a triggering position corresponding to the user request, and an identity of a class I terminal.

8. An electronic device, comprising: a processor, and a memory, configured for storing executable instructions of the processor;
   wherein the executable instructions, when executed by the processor, cause the processor to configured to: when a user request sent by a class I terminal is received, send notification messages to a plurality of class II terminals according to the user request;
   receive message receipts of the notification messages within a preset time select a target message receipt from the message receipts according to a preset rule;
   determine a class II terminal corresponding to the target message receipt as a target class II terminal, and determine to respond to the user request according to the target class II terminal;
   wherein the processor is further configured to: determine a service type corresponding to the user request;
   wherein sending the notification messages to the plurality of class II terminals according to the user request comprises:
   determine a service type corresponding to the user request;
   determine a reference class II terminal matching the service type from the plurality of class II terminals;
   send the notification message to the reference class II terminal;
   wherein sending the notification message to the reference class II terminal comprises:
   query current state corresponding to the reference class II terminal, wherein the current state at least comprises a busy state and an idle state;
   determine the reference class II terminal in the idle state as an idle class II terminal;
   send the notification message to the idle class II terminal;
   wherein after determining the class II terminal corresponding to the target message receipt as the target class II terminal, the processor further configured to:
   determine to respond to the user request according to the target class II terminal,
   send a task pickup failure receipt to the idle class II terminal other than the target class II terminal from the idle class II terminals;

send a task pickup success receipt to the target class II
terminal to switch the target class II terminal from the
idle state to the busy state until the target class II
terminal receives a prompt information indicating an
end of a consultation;
wherein after receiving the message receipts of the notification messages within the preset time, the processor is further configured to:
receive the notification message and display a task pickup interface containing the notification message by the idle class II terminal, and if the idle class II terminal detects a user operation of an acceptance control in the task pickup interface,
return the message receipt of the notification message to a server; and
wherein the task pickup interface further comprises a task pickup countdown display area, a triggering time corresponding to the user request, the service type corresponding to the user request, a triggering position corresponding to the user request, and an identity of a class I terminal.

9. The electronic device according to claim 8, wherein number of the idle class II terminals is greater than or equal to 2, and the processor is further configured to: collect current positions corresponding to the idle class II terminals, respectively; rank the idle class II terminals in an ascending order of distances between the current position corresponding to the idle class II terminals and a user's position; send the notification message to an idle class II terminal corresponding to a current position of a first rank in a ranking result.

10. The electronic device according to claim 8, wherein the processor is further configured to: if the target class II terminal receives a new notification message and is in the busy state, display the task pickup interface containing the new notification message by the target second terminal; wherein the task pickup interface further comprise prompt information configured for prompting to end a current task.

* * * * *